US008116199B2

(12) United States Patent
Tripathi et al.

(10) Patent No.: US 8,116,199 B2
(45) Date of Patent: Feb. 14, 2012

(54) METHOD AND SYSTEM FOR MONITORING NETWORK COMMUNICATION

(75) Inventors: Sunay Tripathi, Palo Alto, CA (US); Nicolas G. Droux, Rio Rancho, NM (US)

(73) Assignee: Oracle America, Inc., Redwood City, CA (US)

( * ) Notice: Subject to any disclaimer, the term of this patent is extended or adjusted under 35 U.S.C. 154(b) by 175 days.

(21) Appl. No.: 12/437,690

(22) Filed: May 8, 2009

(65) Prior Publication Data

US 2010/0284279 A1    Nov. 11, 2010

(51) Int. Cl.
*H04L 12/26* (2006.01)
(52) U.S. Cl. ............. 370/230; 370/235; 370/396; 718/1
(58) Field of Classification Search .................. 370/241, 370/230, 235, 392, 396; 718/1
See application file for complete search history.

(56) References Cited

U.S. PATENT DOCUMENTS

| | | | |
|---|---|---|---|
| 5,918,022 A * | 6/1999 | Batz et al. ............. | 709/236 |
| 6,041,053 A | 3/2000 | Douceur et al. | |
| 6,070,219 A | 5/2000 | McAlpine et al. | |
| 6,131,163 A | 10/2000 | Wiegel | |
| 6,163,539 A | 12/2000 | Alexander et al. | |
| 6,477,643 B1 | 11/2002 | Vorbach et al. | |
| 6,600,721 B2 | 7/2003 | Edholm | |
| 6,714,960 B1 | 3/2004 | Bitar et al. | |
| 6,757,731 B1 | 6/2004 | Barnes et al. | |
| 6,831,893 B1 | 12/2004 | Ben Nun et al. | |
| 6,944,168 B2 | 9/2005 | Paatela et al. | |
| 7,046,665 B1 | 5/2006 | Walrand et al. | |
| 7,146,431 B2 | 12/2006 | Hipp et al. | |
| 7,177,311 B1 | 2/2007 | Hussain et al. | |
| 7,313,142 B2 | 12/2007 | Matsuo et al. | |
| 2002/0052972 A1 | 5/2002 | Yim | |
| 2003/0005164 A1* | 1/2003 | Trainin ........................ | 709/250 |
| 2003/0037154 A1 | 2/2003 | Poggio et al. | |
| 2004/0267866 A1* | 12/2004 | Carollo et al. ................ | 709/200 |
| 2005/0111455 A1 | 5/2005 | Nozue et al. | |
| 2005/0135243 A1* | 6/2005 | Lee et al. ...................... | 370/229 |
| 2005/0138620 A1 | 6/2005 | Lewites | |
| 2006/0041667 A1 | 2/2006 | Ahn et al. | |
| 2006/0045089 A1 | 3/2006 | Bacher et al. | |
| 2006/0070066 A1 | 3/2006 | Grobman | |
| 2006/0174324 A1 | 8/2006 | Zur et al. | |

(Continued)

OTHER PUBLICATIONS

Dovrolis, C., Thayer, B. and Ramanathan , P.: "HIP: Hybrid Interrupt—Polling for the Network Interface", ACM SIGOPS Operating Systems Review, vol. 35, Iss. 4, Oct. 2001, (11 pages).

(Continued)

*Primary Examiner* — Luat Phung
(74) *Attorney, Agent, or Firm* — Osha • Liang LLP

(57) ABSTRACT

A method for monitoring communication on a network. The method includes configuring a classifier using a monitoring rule, receiving a plurality of packets from the network; analyzing each of the plurality of packets by the classifier to determine to which of the plurality of packets satisfies the monitoring rule; forwarding any of the plurality of packets that satisfy the monitoring rule to a first hardware receive ring (HRR) located on a first physical network interface (NI), forwarding any of the plurality of packets that do not satisfy the monitoring rule to a second HRR, and transmitting a first number of packets from the first HRR directly to user level memory, wherein the user level memory resides on a host operatively connected to the first physical NI.

18 Claims, 6 Drawing Sheets

U.S. PATENT DOCUMENTS

2008/0310391 A1* 12/2008 Schneidman et al. ........ 370/349

OTHER PUBLICATIONS

"Solaris Networking—The Magic Revealed (Part I)"; Sunay Tripathi's Solaris Networking Weblog; Nov. 14, 2005, pp. 1-22 (22 pages).

Droux, N.; "Crossbow Virtualization Architecture"; Aug. 28, 2007; Solaris Core OS, Sun Microsystems, Inc.; 51 pages.

Tripathi, S.; "Data Path: Soft Ring Set (SRS) and Soft Rings for Dynamic Polling & Parallelization"; Jul. 23, 2007; 7 pages.

Tripathi, S.; "Crossbow Architectural Document"; Nov. 21, 2006; 19 pages.

Droux, N.; "Crossbow: Network Virtualization and Bandwidth Partitioning"; presented at CHOSUG, Jun. 19, 2007; 23 pages.

Nordmark; E.; "IP Instances—Network Virtualization Meets Zones"; presented at SVOSUG, Oct. 26, 2006; 28 pages.

Tripathi, S.; "CrossBow: Network Virtualization and Resource Control"; presented at SVOSUG, Aug. 24, 2006; 27 pages.

Tripathi, S.; "CrossBow: Network Virtualization and Resource Control"; presented at Sun Labs Open House; Jun. 1, 2006; 24 pages.

Tripathi, S.; "Solaris Networking—The Magic Revealed (Part I)"; Sunay Tripathi's Solaris Networking Weblog; Nov. 14, 2005; (22 pages).

* cited by examiner

METHOD AND SYSTEM FOR MONITORING NETWORK COMMUNICATION

CROSS-REFERENCE TO RELATED APPLICATIONS

The present application contains subject matter that may be related to the subject matter in U.S. patent application Ser. No. 11/226,790 entitled "METHOD AND APPARATUS FOR MONITORING PACKETS AT HIGH DATA RATES," and assigned to the assignee of the present application.

BACKGROUND

Network traffic is transmitted across a network, such as the Internet, from a sending system (e.g., a computer system) to a receiving system (e.g., a computer system) via a network interface card (NIC). The NIC is a piece of hardware found in a typical computer system that includes functionality to send and receive network traffic. Typically, network traffic is transmitted in the form of packets, where each packet includes a header and a payload. The header contains information regarding the source address, destination address, size, transport protocol used to transmit the packet, and various other identification information associated with the packet. The payload contains the actual data to be transmitted from the network to the receiving system.

It is often desirable to monitor packets exchanged between a sending system and a receiving system located on a network. A host, also connected to the network, is often used to perform the aforementioned monitoring. This host acts as an additional receiving system for all packets exchanged between the original sending and receiving systems.

Each of the packets sent between the sending system and receiving system is typically associated with a connection. The connection ensures that packets from a given process on the sending system reach the appropriate process on the receiving system. Packets received by the receiving system (via a NIC associated with the receiving system) are analyzed by a classifier to determine the connection associated with the packet.

Once the classifier determines the connection associated with the packets, the packets are forwarded to a hardware receive ring on the NIC. In some implementations, an interrupt is issued to the CPU associated with the hardware receive ring. In response to the interrupt, a thread associated with the CPU retrieves the packets from the hardware receive ring and places them in the appropriate queue. Once packets are placed in the queue, those packets are processed in due course. Generally, these queues utilize kernel level memory to store the packets.

SUMMARY

In general, in one aspect, the invention relates to a method for monitoring communication on a network. The method includes configuring a classifier using a monitoring rule. The method further includes receiving a plurality of packets from the network. The method further includes analyzing each of the plurality of packets by the classifier to determine to which of the plurality of packets satisfies the monitoring rule. The method further includes forwarding any of the plurality of packets that satisfy the monitoring rule to a first hardware receive ring (HRR) located on a first physical network interface (NI). The method further includes forwarding any of the plurality of packets that do not satisfy the monitoring rule to a second HRR. The method further includes transmitting a first number of packets from the first HRR directly to user level memory, wherein the user level memory resides on a host operatively connected to the first physical NI.

In general, in one aspect, the invention relates to a system, comprising a first physical network interface (NI) configured to receive a plurality of packets from a network. The system further comprises a classifier operatively connected to the network interface and configured to analyze each of the plurality of packets using a monitoring rule and determine to which of a plurality of hardware receive rings (HRR) each of the plurality of packets is forwarded. The system further comprises a first one of the plurality of HRRs configured to receive packets from the classifier that satisfy the monitoring rule, wherein the packets received by the first of the plurality of HRRs are transmitted directly from the first one of the plurality of HRRs to user level memory on a host operatively connected to the plurality of HRRs; and a monitoring application executing on the host, wherein the monitoring application is configured to configure the classifier using the monitoring rule.

In general, in one aspect, the invention relates to a computer readable medium comprising software instructions for monitoring communication on a network, wherein the software instructions comprise functionality to: configure a classifier using a monitoring rule, wherein the classifier resides on a physical network interface card (NI); receive a plurality of packets from the network; analyze each of the plurality of packets by the classifier to determine which of the plurality of packets satisfies the monitoring rule; forward any of the plurality of packets that satisfy the monitoring rule to a first hardware receive ring (HRR); forward any of the plurality of packets that do not satisfy the monitoring rule to a second HRR; and transmit a first number of packets from the first HRR directly to user level memory, wherein the user level memory resides on a host operatively connected to the physical NI.

Other aspects of the invention will be apparent from the following description and the appended claims.

DETAILED DESCRIPTION

Figure 1:
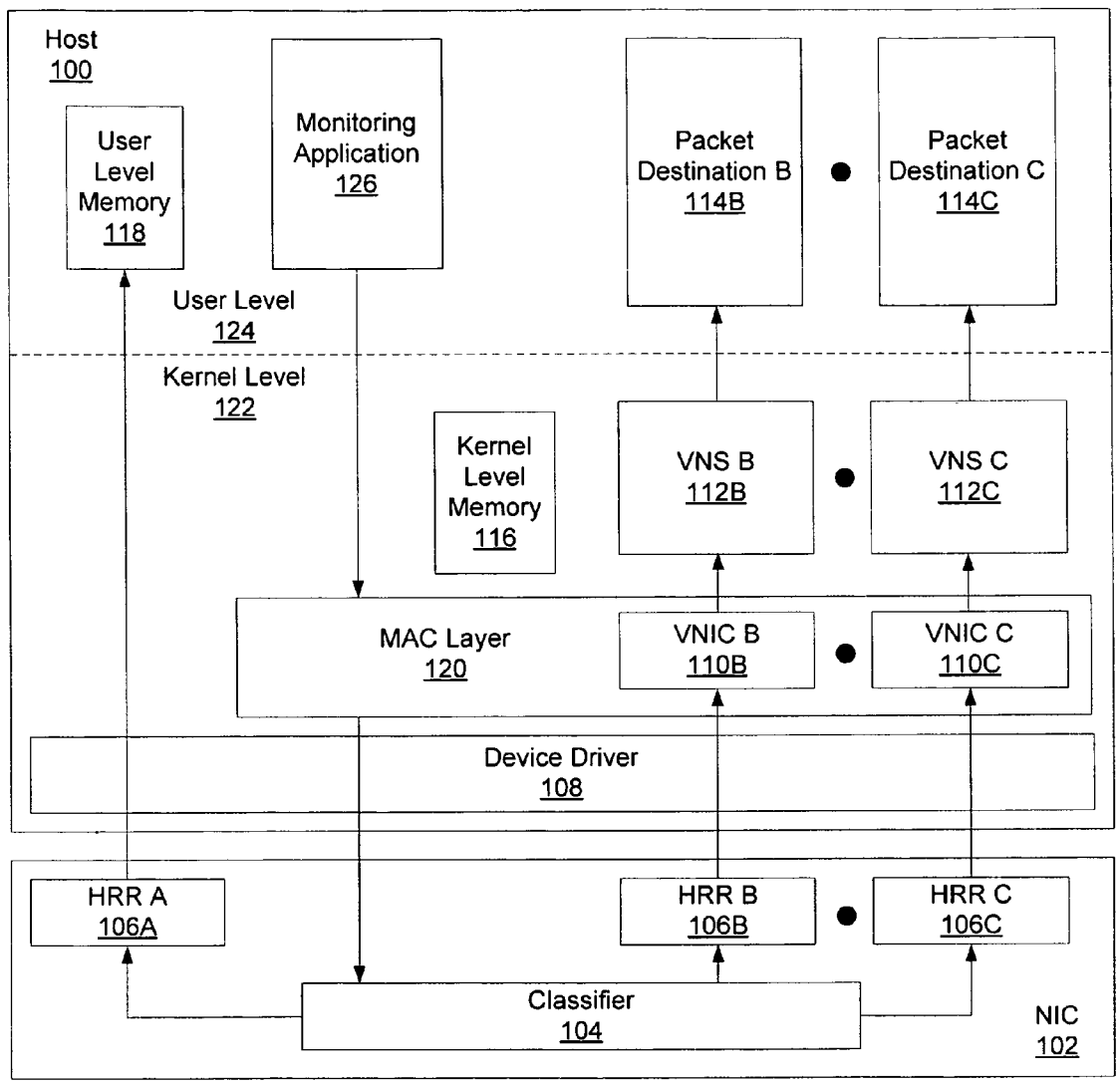
FIG. 1 shows a system in accordance with one or more embodiments of the invention.

Exemplary embodiments of the invention will be described with reference to the accompanying drawings. Like items in the drawings are shown with the same reference numbers.

In an embodiment of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

In general, embodiments of the invention relate to a method and system for monitoring packets on a network. More specifically, embodiments of the invention relate to a method and system for monitoring packets on a network where the packets are sent at high data rates (e.g., 1 Giga bit per second (Gbps)). Further, embodiments of the invention provide a method and system for minimizing the processing overhead required to transfer the packets from a network interface (e.g., a network interface card) to user level memory.

FIG. 1 shows a system in accordance with one embodiment of the invention. As shown in FIG. 1, the system includes a host (100) operatively connected to a network interface card (NIC) (102). The NIC (102) provides an interface between the host (100) and a network (not shown) (e.g., a local area network, a wide area network, a wireless network, etc.). More specifically, the NIC (102) includes an NI (i.e., the hardware on the NIC used to interface with the network). For example, the NI may correspond to an RJ-45 connector, a wireless antenna, etc. The packets received by the NI are then forwarded to other components (not shown) on the NIC (102) for processing, etc. In one embodiment of the invention, the NIC (102) includes a classifier (104) and one or more hardware receive rings (HRRs) (106A, 106B, 106C). In one embodiment of the invention, the HRRs (106A, 106B, 106C) correspond to portions of memory used to temporarily store the received packets. Further, in one embodiment of the invention, a ring element of the HRRs (106A, 106B, 106C) may point to user level memory (118). In one embodiment of the invention, the classifier (104) is configured to analyze the incoming network traffic, typically in the form of packets, received from the network (not shown). Those skilled in the art will appreciate that while the NI in described above as being part of the NIC, the NI may be implemented using other hardware configurations (i.e., in hardware other than a "card").

In one embodiment of the invention, analyzing the packets by the classifier (104) includes analyzing one or more fields in each of the packets to determine to which of the HRRs (106A, 106B, 106C) the packets are forwarded. As an alternative, the classifier (104) may use the contents of one or more fields in each packet as an index into a data structure that includes information necessary to determine to which HRR (106A, 106B, 106C) that packet is forwarded. The classifier (104) may be implemented entirely in hardware (i.e., the classifier (104) may be a separate microprocessor embedded on the NIC (102)). Alternatively, the classifier (104) may be implemented in software stored in memory (e.g., firmware, etc.) on the NIC and executed by a microprocessor on the NIC (102). Those skilled in the art will appreciate that classifier (104) may be configured to separate packets based on monitoring rules.

In one embodiment of the invention, the host (100) may include the following components: a device driver (108), one or more virtual NICs (VNIC) (110B, 110C), one or more virtual network stack(s) (VNS) (112B, 112C), one or more packet destinations (114B, 114C) (e.g., containers and/or services), kernel level memory (116), user level memory (118), and a monitoring application (126). Each of these components is described below.

In one embodiment of the invention, the device driver (108) provides an interface between the HRRs (106A, 106B, 106C) and the host (100). More specifically, the device driver (108) exposes the HRRs (106A, 106B, 106C) to the host (100).

In one embodiment of the invention, each VNIC (110B, 110C) is located within the Media Access Control (MAC) layer (120) of the host. In one embodiment of the invention, each of the VNICs (110B, 110C) is associated with one or more HRRs (106A, 106B, 106C). The VNICs (110B, 110C) provide an abstraction layer between the NIC (102) and the various packet destinations (114B, 114C) (e.g., containers and/or services) and applications executing in the user level (124) on the host (100). More specifically, each VNIC (110B, 110C) operates like a NIC (102). For example, in one embodiment of the invention, each VNIC (110B, 110C) is associated with one or more Internet Protocol (IP) addresses, one or more ports, and configured to handle one or more protocol types. Thus, while the host (100) may be operatively connected to a single NIC (102), packet destinations (114B, 114C) (e.g., containers and/or services) and other applications executing in the user level on the host (100) operate as if the host (100) is bound to multiple NICs. Said another way, each VNIC (110B, 110C) operates like a separate network device connected to the network.

Each of the VNICs (110B, 110C) is operatively connected to a corresponding VNS (112B, 112C). In one embodiment of the invention, each VNS (112B, 112C) includes functionality to process packets in accordance with various protocols used to send and receive packets (e.g., Transmission Communication Protocol (TCP), Internet Protocol (IP), User Datagram Protocol (UDP), etc.). Each VNS (112B, 112C) may also include functionality to send and receive packets from an associated VNIC (110B, 110C). Further, each VNS (112B, 112C) may also include functionality to send and receive packets from one or more associated packet destinations (114B, 114C).

In one embodiment of the invention, each VNS (112B, 112C) includes network layer and transport layer functionality. In one embodiment of the invention, network layer functionality corresponds to functionality to manage packet addressing and delivery on a network (e.g., functionality to support IP, Address Resolution Protocol (ARP), Internet Control Message Protocol, etc.). In one embodiment of the invention, transport layer functionality corresponds to functionality to manage the transfer of packets on the network (e.g., functionality to support TCP, UDP, Stream Control Transmission Protocol (SCTP), etc.).

In one embodiment of the invention, each VNS (e.g., VNS B (112B), VNS C (112C)) is associated with one or more packet destinations (114B, 114C). As discussed above, the host (100) includes one or more packet destinations (114B, 114C) (e.g., containers and/or services). In one embodiment of the invention, the packet destination(s) (114B, 114C) (e.g., containers and/or services) corresponds to any process or group of processes executing on the host that sends and receives network traffic. Examples of packet destinations (114B, 114C) include, but are not limited to containers, services (e.g., web server), etc.

In one embodiment of the invention, the device driver (108), the VNICs (110B, 110C), and the VNSs (112B, 112C) each use memory located on the host (100) to transfer packets. In one embodiment of the invention, the device driver (108), the VNICs (110B, 110C), and the VNSs (112B, 112C) use the kernel level memory (116), located on the host (100). The kernel level memory (116) corresponds to a section of memory located on the host (100) for use by the kernel and other processes executing in the kernel level (122). In one embodiment of the invention, kernel level memory (116) may be implemented using well known memory implementations.

In one embodiment of the invention, packet destinations (114B, 114C) and other user level applications (e.g., monitoring application) use memory located on the host (100), referred to as user level memory (118). In one embodiment of the invention, the user level memory (118) corresponds to a section of memory located on the host (100) for use by processes in the user level (124). In one embodiment of the invention, user level memory (118) may be implemented using well known memory implementations Those skilled in the art will appreciate that the user level memory (118) and the kernel level memory (116) may be located in different locations on the same physical memory. Alternatively, the user level memory (118) and the kernel level memory (116) may be located on separate physical memories.

Continuing with the discussion of FIG. 1, in one embodiment of the invention, processes that use kernel level memory (116) (i.e., the device driver (108), VNICs (110B, 110C), VNSs (112B, 112C)) conceptually exist at the kernel level (122). In one embodiment of the invention, processes that use user level memory (118) (i.e., packet destinations (114B, 114C), other user applications (not shown)) conceptually exist at the user level (124).

In one embodiment of the invention, the monitoring application (126) executes in the user level (124) and corresponds to any application (or process) that includes functionality to monitor network traffic. Further, the monitoring application may include functionality to enable the user to specify one or more monitoring rules. In addition, the monitoring application (126) may include functionality to directly or indirectly configure the classifier (e.g., 104 in FIG. 1) as well as other portions of the host (100) to implement the monitoring rules. In one embodiment of the invention, the monitoring application (126) configures the classifier by transmitting the classifier configuration instructions through a MAC layer (120) located on the host (100). In one embodiment of the invention, the monitoring application (126) configures elements on the NIC (102) directly, without passing through the MAC layer (120).

In one embodiment of the invention, each monitoring rule may include parameters set by a user. Examples of monitoring include, but are not limited to: (i) all packets from a particular sending system identified using a MAC address and/or an IP address; (ii) all packets being sent to a particular receiving system identified by a MAC address and/or an IP address; (iii) all packets between a particular sending system and receiving system, each identified by a MAC address and/or an IP address; (iv) all packets from a particular sending system to a particular receiving system, each identified by a MAC address and/or an IP address; (v) all packets from a particular subnet; (vi) all packets to a particular subnet; (vii) all packets associated with a connection (e.g., MAC addresses, IP address, TCP port numbers, UDP port numbers, etc.); (viii) all packets associated with a specific service (e.g., a well-known ULP port number); and (ix) a subset of packets that satisfy any of rules (i)-(viii).

In one embodiment of the invention, the monitoring application (126) includes the functionality to preallocate user level memory (118) to store packets. In one embodiment of the invention, the monitoring application (126) may preallocate a single contiguous region within user level memory (118) for packets that satisfy at least one monitoring rule. In one embodiment of the invention, the monitoring application (126) may preallocate separate regions within user level memory (118), where each location within user level memory (118) may be associated with a different monitoring rule. Further, the monitoring application may include the functionality to generate user level memory descriptors associated with the memory allocated within user level memory (118). In one embodiment of the invention, the monitoring application includes the functionality to provide the classifier (104) with the user level memory descriptors.

In one embodiment of the invention, the user level memory descriptors may be translated into memory descriptors usable by kernel level processes and/or processes executing on the NIC. Translating user level memory descriptors into memory descriptors usable by other processes may require the use of a translation algorithm. In one embodiment of the invention, the translation algorithm may be implemented by the monitoring application (126). Alternatively, the translation algorithm may be implemented within the MAC layer (120). In another embodiment of the invention, the translation algorithm may be performed by any combination of hardware and software within the NIC (104).

In one embodiment of the invention, the monitoring application (126) may directly configure the classifier (104) using the memory descriptors. In one embodiment of the invention, the monitoring application (126) may pass the memory descriptors through the MAC layer (120) to configure the classifier (104).

In one embodiment of the invention, the monitoring application (126) may also include the functionality to analyze packets. Packet analysis may include, but its not limited to, statistical information gathering, message extraction, attack detection, etc. Those skilled in the art will appreciate that the monitoring application (126) may be configured to carry out other forms of packet analysis.

In one embodiment of the invention, the purpose of classifying the packets is to determine to which of the HRRs (106A, 106B, 106C) each of the packets is forwarded. In one embodiment of the invention, at least one HRR (106A) is configured to store packets that satisfy one or more monitoring rules. In one embodiment of the invention, packets that do not satisfy one or more monitoring rules are forwarded to a HRR (106A, 106B, 106C). In one embodiment of the invention, packets that do not satisfy a monitoring rule are discarded.

Continuing with the discussion of FIG. 1, in one embodiment of the invention, at least one HRR (106A) is configured to transfer stored packets directly to user level memory (118). In one embodiment of the invention, packets that satisfy the monitoring rule are transferred from the HRR (106A) directly to user level memory (118) without being copied into kernel level memory (116). More specifically, packets that satisfy the monitoring rule are transferred directly to the location in user level memory (118) associated with the user memory descriptors generated by the monitoring application (126).

In one embodiment of the invention, packets are transferred directly from a HRR (106A) to user level memory (118) using a direct memory access (DMA) engine (not shown). More specifically, the DMA engine also include the functionality to transfer data directly from a HRR (106A) to user level memory (118).

In one embodiment of the invention, the monitoring application (126) may directly or indirectly configure the classifier (104) with more than one monitoring rule. In one embodiment of the invention, each monitoring rule may be associated with a different HRR (106A, 106B, 106C). In one embodiment of the invention, each HRR (106A, 106B, 106C) may receive packets that satisfy a single monitoring rule, or a HRR (106A, 106B, 106C) may receive packets that satisfy one of a number of monitoring rules.

In one embodiment of the invention, a system, as shown in FIG. 1, may include multiple hosts (such as host (100) in FIG. 1) where each host is operatively connected to one or more NICs. In one embodiment of the invention, each of the NICs may correspond to the NIC shown in FIG. 1 (i.e., NIC (102)).

Those skilled in the art will appreciate that the HRRs (106A, 106B, 106C) are typically configured to store a limited number of packets. Further, once the HRRs (106A, 106B, 106C) are "full" (i.e., the HRRs (106A, 106B, 106C) cannot store any additional packets), then the packets received after this point are dropped (i.e., the are not stored in the HRRs (106A, 106B, 106C)). Further, those skilled in the art will appreciate that the HRRs (106A, 106B, 106C) become "full" when the rate at which the packets are received by the HRRs (106A, 106B, 106C) is greater than the rate at which the packets are removed from the HRRs (106A, 106B, 106C).

In one embodiment of the invention, a bandwidth control may be used to control the rate at which packets are transmitted from the HRR (106A) configured to receive packets that satisfy a monitoring rule, to the preallocated memory located in the user level memory (118). In one embodiment of the invention, the bandwidth control is performed by a process associated with the kernel level (122) located on the host (100). In another embodiment of the invention, the bandwidth control is performed by the monitoring application (126).

In one embodiment of the invention, the bandwidth control includes transferring a number of packets from the HRR (106A) configured to receive packets that satisfy the monitoring rule to the preallocated memory located in the user level memory (118) using a polling mechanism. The polling mechanism may refer to any polling mechanism well known in the art. In one embodiment of the invention, the polling mechanism is controlled by a process associated with the kernel level (122) located on the host (100). In another embodiment of the invention, the polling mechanism is controlled by the monitoring application (126).

One or more embodiments described with regard to FIG. 1 packets transmitted on a network may be obtained without the monitoring system (e.g., 100 in FIG. 1) being interposed on the path between sending and receiving system being monitored. Said another way, the embodiments described in FIG. 1 do not require that the packets pass through a computer system implementing embodiments shown in FIG. 1.

Figure 2:
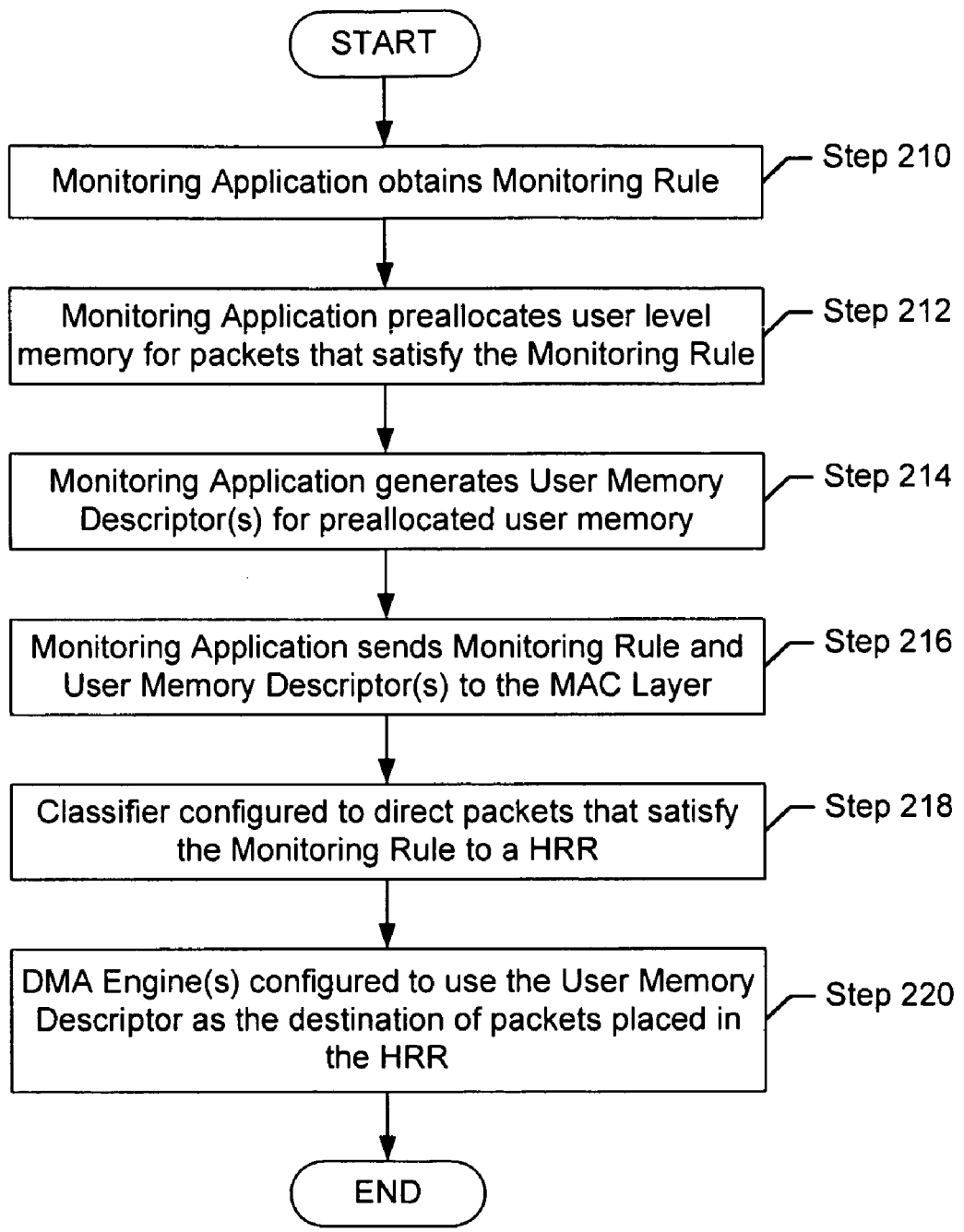
FIG. 2 shows a flowchart in accordance with one or more embodiments of the invention.

FIG. 2 shows a flow chart for configuring the classifier in accordance with one or more embodiments of the invention. In one or more embodiments of the invention, one or more of the steps shown in FIG. 2 may be omitted, repeated, and/or performed in a different order than that shown in FIG. 2. Accordingly, the specific arrangement of steps shown in FIG. 2 should not be construed as limiting the scope of the invention.

In Step 210, a monitoring application obtains a monitoring rule. In Step 212, the monitoring application preallocates user level memory for packets that satisfy the monitoring rule. Those skilled in the art will appreciate that preallocating user level memory may be accomplished with a program that is not the monitoring application. Further, the user level memory may be preallocated at any point prior to generating user level memory descriptors.

In Step 214, the monitoring application generates the user level memory descriptors. If required, the memory descriptors may be translated (as described above) using a translation algorithm. In Step 216, the monitoring application sends the monitoring rule and the user level memory descriptors to the MAC layer. Alternatively, the monitoring application may pass the memory descriptors directly to the NIC. In Step 218, the classifier is configured to direct packets that satisfy the monitoring rule to a HRR. In addition, the classifier is also configured to direct packets received for the various VNICs on the host to the appropriate HRRs. In Step 220, the Data Management Access (DMA) engine is configured using the user level memory descriptors.

Figure 3:
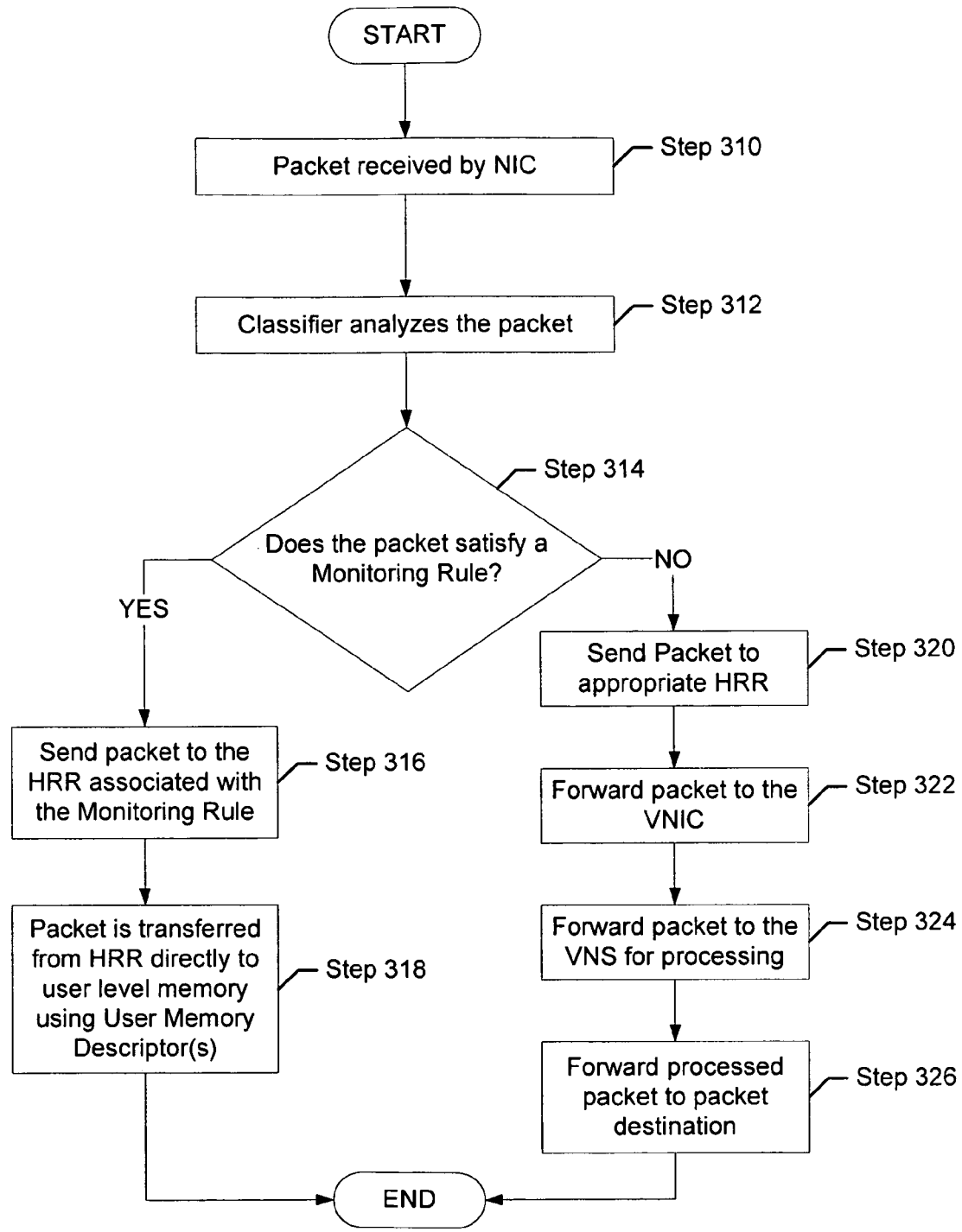
FIG. 3 shows a flowchart in accordance with one or more embodiments of the invention.

FIG. 3 shows a flow chart for monitoring packets in accordance with one or more embodiments of the invention. In one or more embodiments of the invention, one or more of the steps shown in FIG. 3 may be omitted, repeated, and/or performed in a different order than that shown in FIG. 3. Accordingly, the specific arrangement of steps shown in FIG. 3 should not be construed as limiting the scope of the invention.

In Step 310, a packet is received from a network (internal or external) via a physical NIC. In Step 312, the classifier analyzes the packet in order to determine to which HRR the packet is to be directed.

In Step 314, a determination is made as to whether the packet satisfies a monitoring rule. If the packet satisfies a monitoring rule, then in Step 316 the packet is sent to the HRR associated with the monitoring rule. In Step 318, the packet is transferred from the HRR directly to user level memory using the user level memory descriptors associated with the monitoring rule. Once a packet is placed in user level memory, the monitoring application may generate new memory descriptors and pass the new memory descriptors to the NIC (e.g., by executing Step 214 and Step 216 in FIG. 2).

If the packet does not satisfy a monitoring rule, then in Step 320 the packet is sent to the appropriate HRR based on other classification rules as described in Step 218. In Step 322, the packet is then forwarded to the VNIC associated with the HRR. In Step 324, the packet is forwarded to the VNS for processing. In Step 326, the processed packet is forwarded to the packet destination.

Figure 4:
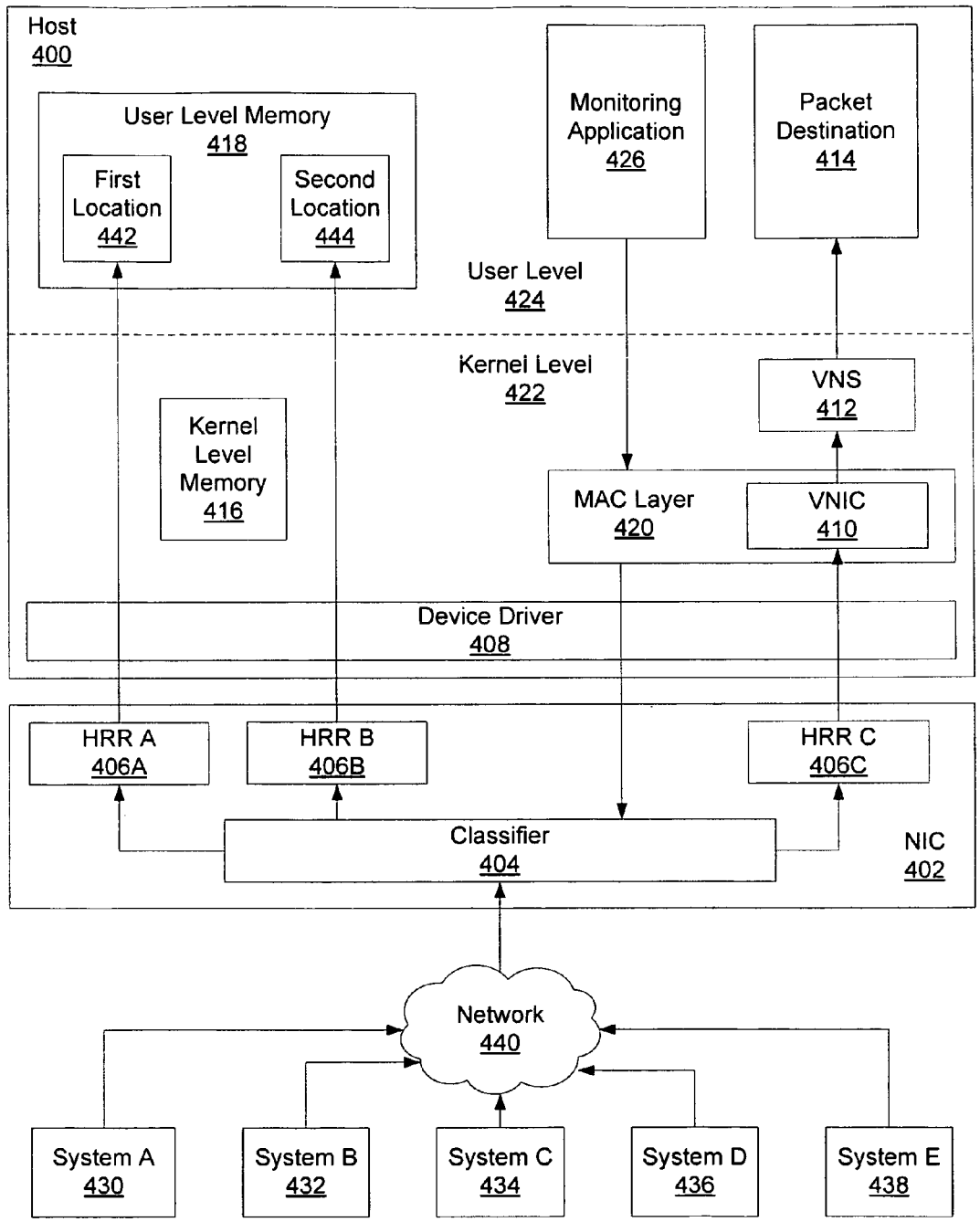
FIG. 4 shows an example in accordance with one or more embodiments of the invention.

FIG. 4. shows an exemplary system in accordance with one embodiment of the invention. The exemplary system and accompanying example are not intended to limit the scope of the invention. The system shown in FIG. 4 includes five systems (system A (430), system B (432), system C (434), system D (436), and system E (438)) that a monitoring application (426) residing on a host (400) is monitoring. All systems as well as the host (400) are connected through a network (440). The host (400) is connected to the network (440) through the NIC (402). The NIC (402) includes a classifier (404) and three HRRs (406A, 406B, 406C). The classifier (404) is configured to analyze the incoming network traffic, typically in the form of packets, received from the network (440), and forward the packets to the appropriate HRR (406A, 406B, 406C). Those skilled in the art will appreciate that the host (400) may be configured to intercept all traffic communicated on the network (440).

Continuing with the discussion of FIG. 4, the host (400) includes a device driver (408) a VNIC (410), a VNS (412), and kernel level memory (416), each conceptually located at kernel level (422). The host (400) also includes a packet destination (414) (e.g., containers and/or services), user level memory (418), and a monitoring application (426), each conceptually located at the user level (424).

The monitoring application (426) configures the classifier (404). In this example, a first monitoring rule specifies that all packets transmitted from system A (430) to system B (432) satisfy the first monitoring rule. A second monitoring rule specifies that all packets received by system C (434) from any of system A (430), system B (432), system D (436), and system E (438), satisfy the second monitoring rule. The monitoring application (426) configures the classifier (404), via the MAC layer (420), to forward all packets transmitted from system A (430) to system B (432) to HRR A (406A). Similarly, the monitoring application (426) configures the classifier (404) to forward all packets destined for system C (434), regardless of origin, to HRR B (406B). All other packets not meeting the aforementioned criteria, are either forwarded by the classifier (404) to HRR C (406C) or alternatively dropped (i.e., not stored in any of the HRRs).

The monitoring application (426) also preallocates a first location (442) and a second location (444) within the user level memory (418). The monitoring application specifies that packets in HRR A (406A) are to be stored in the first location (442) in user level memory (418) and that packets in the HRR B (406B) are to be stored in the second location (444) in user level memory (418).

Once the aforementioned system is configured and network traffic between the aforementioned systems is monitored, the packets satisfying the monitoring rules are stored in the appropriate HRRs. Further, the packets in HRR A (406A) and HRR B (406B) are directly transferred to the user level memory (418). In one embodiment of the invention, the direct copying from the HRR to the user level memory eliminates the requirement to have the packets initially copied from the HRR to the kernel level memory and then copied from the kernel level memory to the user level memory.

Figure 5:
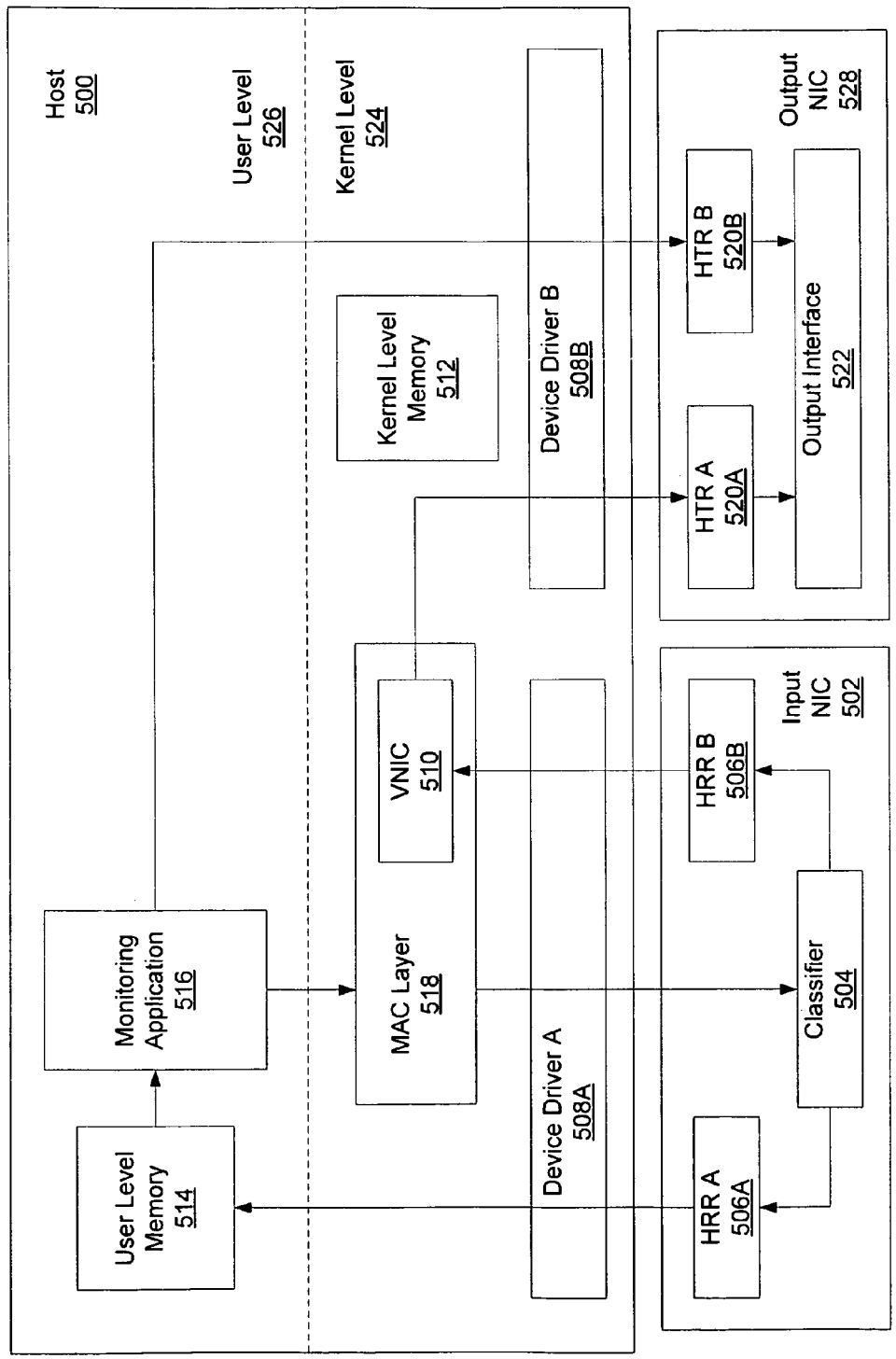
FIG. 5 shows a computer system in accordance with one or more embodiments of the invention.

FIG. 5 shows a system in accordance with one embodiment of the invention. As shown in FIG. 5, the system includes a host (500) operatively connected to an input NIC (502) and an output NIC (528). The input NIC (502) provides an interface between the host (500) and a network (not shown). In one embodiment of the invention, the input NIC (502) includes a classifier (504) and one or more HRRs (506A, 506B). In one embodiment of the invention, the HRRs (506A, 506B) are functionally similar to the HRRs depicted in FIG. 1 (106A, 106B, 106C in FIG. 1) and correspond to portions of memory used to temporarily store the received packets. Further, in one embodiment of the invention, a ring element of the HRRs (506A, 506B) may point to user level memory (514). In one embodiment of the invention, the classifier (504) is configured to analyze the incoming network traffic, typically in the form of packets, received from the network (not shown). In one embodiment of the invention, analyzing the packets by the classifier (504) is functionally similar to the classifier described in FIG. 1 (104 in FIG. 1).

In one embodiment of the invention, and as depicted in FIG. 5, the host (500) may include the following components: an input device driver (508A), an output device driver (508B) one or more VNICs (510), kernel level memory (512), user level memory (514), and a monitoring application (516). Each of these components is described below.

In one embodiment of the invention, the input device driver (508A) provides an interface between the HRRs (506A, 506B) and the host (500). More specifically, the input device driver (508) exposes the HRRs (506A, 506B) to the host (500). In one embodiment of the invention, the output device driver (508B) provides an interface between the host (500) and the hardware transmit rings (HTRs) (520A, 520B) residing on the output NIC (528)

In one embodiment of the invention, the VNIC (510) is located within the Media Access Control (MAC) layer (518) of the host. In one embodiment of the invention, the VNIC (510) is associated with one or more HRRs (506A, 506B). The VNIC (510) provides an abstraction layer between the input NIC (502) and the output NIC (528) operatively connected to the on the host (500). More specifically, each VNIC (510) operates like a NIC, and is similar in functionality to the VNICs described with regard to FIG. 1. (e.g., VNIC B (110B), VNIC C (110C) in FIG. 1).

In one embodiment of the invention, the VNIC (510) is configured to receive packets from a HRR (506A, 506B) and forward such packets to one or more HTRs (520A, 520B). Each HTR (520A, 520B) corresponds to a buffer on the output NIC (502), and is configured to receive packets from the host (500) and forward such packets to an output interface (522). In one embodiment of the invention, at least one HTR (520A) is configured to receive outbound packets from one or more VNICs (510). In one embodiment of the invention, at least one HTR (520B) is configured to receive packets from user level memory (514). In one embodiment of the invention, a single HTR (520A, 520B) may be configured to receive packets from more than one element on the host (500).

In one embodiment of the invention, the device drivers (508A, 508B) and the VNIC (510) each use memory located on the host (500) to transfer packets. In one embodiment of the invention, the device drivers (508A, 508B) and the VNIC (510) use the kernel level memory (512), located on the host (500). The kernel level memory (512) corresponds to a section of memory located on the host (500) for use by the kernel and other processes executing in the kernel level (524). In one embodiment of the invention, kernel level memory (512) may be implemented using well known memory implementations.

In one embodiment of the invention, user level applications (e.g., monitoring application (516)) use memory located on the host (500), referred to as user level memory (514). In one embodiment of the invention, the user level memory (514) corresponds to a section of memory located on the host (500) for use by processes in the user level (526). In one embodiment of the invention, user level memory (514) may be implemented using well known memory implementations Those skilled in the art will appreciate that the user level memory (514) and the kernel level memory (512) may be located in different locations on the same physical memory. Alternatively, the user level memory (514) and the kernel level memory (512) may be located on separate physical memories.

Continuing with the discussion of FIG. 5, in one embodiment of the invention, processes that use kernel level memory (512) (i.e., the device drivers (508A, 508B) and the VNICs (510)) conceptually exist at the kernel level (524) and processes that use user level memory (514) (i.e., the monitoring application (516) and other user applications (not shown)) conceptually exist at the user level (526).

In one embodiment of the invention, at least one HRR (506A) is configured to transfer stored packets directly to user level memory (514) in a manner functionally similar to that described with regard to FIG. 1 (e.g., in FIG. 1, HRR A (106A) is configured to transfer stored packets directly to user level memory (118)). In one embodiment of the invention, the monitoring application (516) is functionally similar to the monitoring application described with regard to FIG. 1 (e.g., monitoring application (126) in FIG. 1). Specifically, the monitoring application may include the functionality to configure the classifier, directly or indirectly, with one or more monitoring rules, preallocate user level memory, and analyze packets.

In one embodiment of the invention, and as depicted in FIG. 5, the monitoring application (516) may also include the functionality to forward packets from user level memory (514) to a HTR (520B) located on the output NIC (528). Packets may be forwarded using a DMA engine (described above). For the purposes of FIG. 5, packets are depicted as being forwarded from user level memory (514) to HTR B (520B) through the monitoring application. This depiction represents packet movement from user level memory (514) to HTR B (520B) under the control of the monitoring application (516).

The embodiment of the invention represented by FIG. 5 may be used to analyze packets sent over a network between two systems. For example, the embodiment of the invention as depicted by FIG. 5 may be implemented between two computer systems on a network (i.e., may be interposed between the two system such that packets pass through the system implementing the invention (e.g., 500 in FIG. 5)). In accordance with one or more embodiments of the invention, once a packet is received and classified by the classifier, the packet may be (i) forwarded to the packet's destination address via VNIC (510) and subsequently sent back to the network (without copying the packets into the user level memory) or (ii) transfer directly to user level memory, analyzed by the monitoring application and, optionally, sent back to the network. In scenario (ii), the monitoring application may send the packets directly from the user level memory (514) to the corresponding HTR bypassing the kernel level memory.

Figure 6:
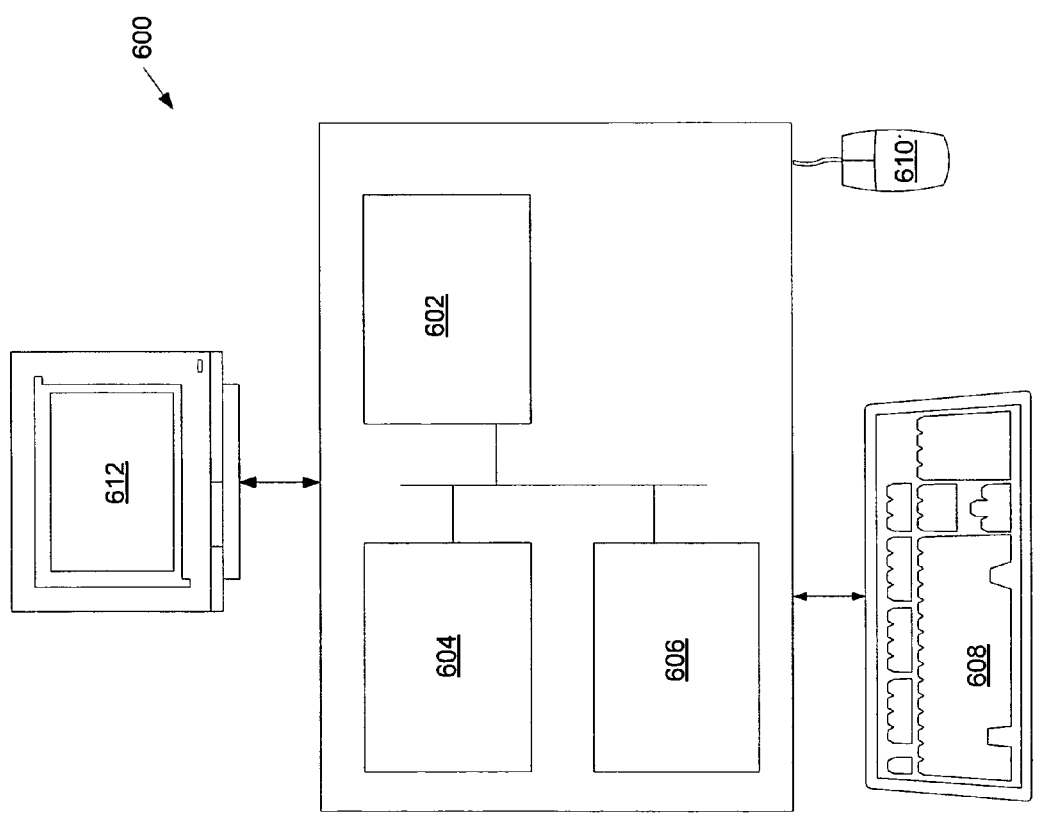
FIG. 6 shows a computer system in accordance with one or more embodiments of the invention.

An embodiment of the invention may be implemented on virtually any type of computer regardless of the platform being used. For example, as shown in FIG. 6, a networked computer system (600) includes a processor (602), associated memory (604), a storage device (606), and numerous other elements and functionalities typical of today's computers (not shown). The networked computer (600) may also include input means, such as a keyboard (608) and a mouse (610), and output means, such as a monitor (612). The networked computer system (600) is connected to a local area network (LAN) or a wide area network via a network interface connection (not shown). Those skilled in the art will appreciate that these input and output means may take other forms. Further, those skilled in the art will appreciate that one or more elements of the aforementioned computer (600) may be remotely located and connected to the other elements over a network. Further, software instructions to perform embodiments of the invention may be stored on a computer readable medium such as a compact disc (CD), a diskette, a tape, or any other physical computer readable storage device.

Embodiments of the invention enable users to monitor packets exchanged between one or more sending systems and one or more receiving systems using a network with very heavy traffic.

While the invention has been described with respect to a limited number of embodiments, those skilled in the art, having benefit of this disclosure, will appreciate that other embodiments may be devised which do not depart from the scope of the invention as disclosed herein. Accordingly, the scope of the invention should be limited only by the attached claims.

What is claimed is:

1. A method for monitoring communication on a network comprising:
   configuring a classifier using a monitoring rule;
   receiving a plurality of packets from the network;
   analyzing each of the plurality of packets by the classifier to determine to which of the plurality of packets satisfies the monitoring rule;
   forwarding any of the plurality of packets that satisfy the monitoring rule to a first hardware receive ring (HRR) located on a first physical network interface (NI);
   forwarding any of the plurality of packets that do not satisfy the monitoring rule to a second HRR;
   transmitting a first number of packets from the first HRR directly to user level memory, wherein the user level memory resides on a host operatively connected to the first physical NI;
   analyzing the first number of packets, located in user level memory;
   transmitting a second number of packets from the second HRR to a virtual network interface card (VNIC);
   transmitting the second number of packets from the VNIC to a first hardware transmit ring (HTR) on a second physical NI; and
   transmitting the second number of packets from the first HTR to the network.

2. The method of claim 1, wherein the analyzing the first number of packets is performed by a monitoring application executing in a user level of the host.

3. The method of claim 1, further comprising:
   transmitting a third number of packets from the second HRR to the VNIC;
   transmitting the third number of packets from the VNIC to a virtual network stack (VNS);
   processing the third number of packets by the VNS to obtain a second number of processed packets, wherein the second number of packets is stored in the kernel level memory during the processing; and
   transmitting the second number of processed packets from the VNS to a packet destination.

4. The method of claim 1, further comprising:
   transmitting the first number of packets from the user level memory to a second HTR on the second physical NI; and
   transmitting the first number of packets from the second HTR to the network.

5. The method of claim 1, wherein the classifier is configured using a monitoring application executing in a user level of the host.

6. The method of claim 1, wherein the monitoring rule specifies at least one selected from the group consisting of packets that originated from a sending system and packets destined for a receiving system.

7. The method of claim 1, wherein transmitting the first number of packets from the first HRR to the user level memory comprises determining a number of packets to transfer based on a bandwidth control, wherein the bandwidth control is performed by one selected from a group consisting of a kernel level process and a monitoring application.

8. The method of claim 1, wherein transmitting the first number of packets from the first HRR to the user level memory further comprises:
   transferring the first number of packets using a polling mechanism, wherein the polling mechanism is controlled by one selected from a group consisting of a kernel level process and a monitoring application.

9. A system, comprising:
   a first physical network interface (NI) configured to receive a plurality of packets from a network;
   a classifier operatively connected to the network interface and configured to analyze each of the plurality of packets using a monitoring rule and determine to which of a plurality of hardware receive rings (HRR) each of the plurality of packets is forwarded;
   a first one of the plurality of HRRs configured to receive, from the classifier, packets that satisfy the monitoring rule, wherein the packets received by the first of the plurality of HRRs are transmitted directly from the first one of the plurality of HRRs to user level memory on a host operatively connected to the plurality of HRRs;
   a monitoring application executing on the host, wherein the monitoring application is configured to configure the classifier using the monitoring rule;
   a virtual network interface card (VNIC), wherein the VNIC is configured to receive packets from a second one of the plurality of HRRs, wherein the classifier is configured to direct, to the second one of the plurality of HRRs, packets that do not satisfy the monitoring rule; and
   a first hardware transmit ring (HTR) on a second physical NI and configured to receive packets from the VNIC, wherein the received packets are transmitted to the network.

10. The system of claim 9, further comprising:
a second HTR, operatively connected to the second physical NI and configured to received packets transmitted from user level memory by the monitoring application, wherein packets received by the second HTR are transmitted to the network.

11. The system of claim 9, further comprising:
a virtual network stack (VNS), wherein the VNS is configured to receive packets from the VNIC, wherein the received packets are stored in a kernel level memory; and
a packet destination located in a user level of the host, wherein the packet destination is configured to receive packets from the VNS, wherein the packets received by the packet destination are stored in the user level memory,
wherein the VNIC, the VNS, and the packet destination are located on the host.

12. The system of claim 9, wherein the monitoring application analyzes the packets transmitted to user level memory.

13. The system of claim 9, wherein the monitoring rule specifies at least one selected from a group consisting of packets that originated from a sending system and packets destined for a receiving system.

14. The system of claim 9, wherein the monitoring application is configured to receive packets in accordance with a bandwidth control, wherein the bandwidth control is performed by one selected from a group consisting of a kernel level process and the monitoring application.

15. The system of claim 14, wherein the bandwidth control specifies a number of packets that may be transferred to the monitoring application within a given period of time.

16. The system of claim 15, wherein the bandwidth control is enforced by a polling mechanism, wherein the polling mechanism is controlled using one selected from a group consisting of the kernel level process and the monitoring application.

17. A non-transitory computer readable medium comprising software instructions for monitoring communication on a network, wherein the software instructions comprise functionality to:
configure a classifier using a monitoring rule, wherein the classifier resides on a physical network interface (NI);
receive a plurality of packets from the network;
analyze each of the plurality of packets by the classifier to determine which of the plurality of packets satisfies the monitoring rule;
forward any of the plurality of packets that satisfy the monitoring rule to a first hardware receive ring (HRR);
forward any of the plurality of packets that do not satisfy the monitoring rule to a second HRR; and
transmit a first number of packets from the first HRR directly to user level memory, wherein the user level memory resides on a host operatively connected to the physical NI;
analyze the first number of packets, located in user level memory;
transmit a second number of packets from the second HRR to a virtual network interface card (VNIC);
transmit the second number of packets from the VNIC to a first hardware transmit ring (HTR) on a second physical NI; and
transmit the second number of packets from the first HTR to the network.

18. The non-transitory computer readable medium of claim 17, wherein analyzing the first number of packets is performed by a monitoring application, wherein the classifier is configured using the monitoring application, and wherein the user level memory is preallocated by the monitoring application executing in a user level of the host.

* * * * *